(12) United States Patent
Kim et al.

(10) Patent No.: US 6,937,878 B2
(45) Date of Patent: Aug. 30, 2005

(54) MOBILE COMMUNICATION NETWORK SYSTEM USING DIGITAL OPTICAL LINK

(75) Inventors: Chang-Won Kim, Suwon-shi (KR); Kwang-JiN Yang, Yongin-shi (KR); Yun-Je Oh, Suwon-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 666 days.

(21) Appl. No.: 09/818,211

(22) Filed: Mar. 27, 2001

(65) Prior Publication Data

US 2002/0003645 A1 Jan. 10, 2002

(30) Foreign Application Priority Data

Jul. 10, 2000 (KR) ........................................ 2000-39212

(51) Int. Cl.[7] .............................................. H04M 1/00
(52) U.S. Cl. ...................... 455/561; 455/453; 455/17; 455/3.05; 455/560
(58) Field of Search ................................ 455/561, 453, 455/422.1, 560; 359/333, 337.13, 341.1, 341.2

(56) References Cited

U.S. PATENT DOCUMENTS

| | | | |
|---|---|---|---|
| 5,682,256 A | 10/1997 | Motley et al. | ............. 359/117 |
| 6,222,658 B1 * | 4/2001 | Dishman et al. | ............. 398/205 |
| 6,314,163 B1 * | 11/2001 | Acampora | ................. 379/56.2 |
| 6,324,391 B1 * | 11/2001 | Bodell | ........................ 455/403 |
| 6,353,600 B1 * | 3/2002 | Schwartz et al. | ........... 370/328 |
| 6,415,132 B1 * | 7/2002 | Sabat, Jr. | .................... 455/3.01 |

FOREIGN PATENT DOCUMENTS

| | | | |
|---|---|---|---|
| EP | 0 805 569 A1 | 11/1997 | |
| GB | 2 300 333 A | 10/1996 | |
| JP | 05-014264 | 1/1993 | ............ H04B/7/26 |
| JP | 06-153255 | 5/1994 | ............ H04Q/7/04 |
| JP | 08-191478 | 7/1996 | ............ H04Q/7/36 |
| JP | 09-200840 | 7/1997 | ............ H04Q/7/36 |
| JP | 11-225113 | 8/1999 | ........... H04B/10/02 |

* cited by examiner

Primary Examiner—Temica Beamer
(74) Attorney, Agent, or Firm—Cha & Reiter, L.L.C.

(57) ABSTRACT

Disclosed is a mobile communication network employing a plurality of digital optical links for providing high speed, more capacity and multimedia services which includes a base station (BS) controller for managing the overall control of the mobile network and coupled to a base transceiver system (BTS) via a first E1/T1 link; a BTS controller coupled to the BS controller via a second E1/T1 link for managing the channel capacity of multiple base transceiver system operable by the base station controller; a plurality of optical fiber links coupled to said BTS controller through optical coupling; a plurality of compact base transceiver systems (BTSs) having a plurality of optical transponders arranged in space relation with each other along each of said optical fiber links; said optical transponders for receiving an up-link signal at one frequency to be retransmitted as a down-link signal and for amplifying said up-link signal at another frequency to other compact BTS along said optical fiber link.

9 Claims, 6 Drawing Sheets

FIG. 1 [PRIOR ART]

MOBILE COMMUNICATION NETWORK SYSTEM USING DIGITAL OPTICAL LINK

CLAIM OF PRIORITY

This application makes reference to and claims all benefits accruing under 35 U.S.C. Section 119 from an application entitled, "Mobile Communication Network System Using Digital Optic Link", filed with the Korean Industrial Property Office on Jul. 10, 2000 and there duly assigned Ser. No. 2000-39212.

BACKGROUND OF THE INVENTION

1. Field of the Invention

The present invention relates generally to a mobile communication network. More particularly, the present invention relates to a mobile communication network for the provision of digital optical transmission through an optical link in the base transceiver system of a digital cellular system (DCS), a mobile telephone network, a personal communication system, a mobile communication system of the next generation (IMT2000), etc.

2. Description of the Related Art

FIG. 1 illustrates a conventional mobile communication system for controlling a plurality of base transceiver systems, which comprises a mobile station (MS) 12; a plurality of base transceiver systems (BTS) 5; a base station controller (BSC) 3 in communication with the BTSs; a mobile switching center (MSC) 2 coupled to the BSC 3; and, a public switching telephone network (PSTN) 1. The mobile station 12 is a terminal unit that allows a subscriber to communicate within the mobile communication networks. The base transceiver systems 5 establish a wireless connection to the mobile station 12 and control the mobile station 12 through the established communication channels. The base station controller 3 controls both wireless and wired connections and couples the existing network to other communication networks. A single base station controller 3 typically employs E1/T1 links for controlling the plurality of BTSs 5. However, the installation cost of the plurality of BTSs is enormous and each BTS only provides a limited cell coverage area. A cell is classified according to its size, i.e., a macro cell (about 5 km–30 km); a micro cell (about 500 m–1 km); and a mega cell using low-orbit satellites (100 km). For example, the reference number 6 represents the cell coverage of a base transceiver system 5.

A plurality of optical repeaters 7 employing a sub-carrier multiplexing (SCM) scheme have been developed to provide services beyond the assigned cell coverage area in the areas where the installation of the base transceiver systems is difficult and the reception of the electromagnetic radiation signals is poor. The optical repeaters 7 are employed to secure a broader cell coverage in the regions where the traffic usage is low. In this prior art system, many remote base transceiver systems (BTSs) includes optical repeaters that are installed within the network with one reference base transceiver system 5 for controlling the optical repeaters 7. In the regions where the installation of a reference BTS 5 is costly and the expected traffic is not so heavy, i.e., skiing resorts, golf courses, streets, remote villages, optical repeaters are used to cover the same regions (i.e., reference number 8 represents the cell coverage of each optical repeater) in the prior art system. To this end, the optical divider 11 is provided in the reference base transceiver system 5 to transmit data to each optical repeater 7 through the optical fibers 10. Thus, the conventional art system has some merit of efficiently reducing the enormous cost of installing the reference base transceiver system 5.

However, the optical divider 11 used in the prior art system has some drawbacks in that the multiple optical fibers 10 has be installed as many as the respective optical repeaters 7. Another drawback is that the optical fibers 10 corresponding to the respective optical repeaters 7 have to be installed around highways, in tunnels and buildings. As each repeater requires a dedicated fiber line, the cost of this type of installation is very high.

Moreover, the conventional mobile communication system is not equipped to prove multimedia service requiring higher speed and capacity, thus causing a problem during an access operation between the optical repeaters and the base transceiver systems.

As the prior art system employs optical repeaters to secure broader coverage beyond the existing cell coverage of the BTSs by means of the optical fibers matching the respective optical repeaters, it has a structural disadvantage in installation around highways or inside buildings. Moreover, if the optical fibers are arranged in parallel, the expenses associated in installing the optical fibers and the dedicated lines will increase dramatically. Furthermore, the distance between the reference base transceiver system and the optical repeaters is limited in the range of 20 Km. Hence, the business sector would have the double burden of installing more optical repeaters as well as the reference base transceiver system.

SUMMARY OF THE INVENTION

It is, therefore, an object of the present invention to provide a mobile communication network that realizes high speed, larger capacity and multimedia services by the means of digital optical communication networks, while achieving economical installation and operation of respective base transceiver systems without any additional installation of a reference base transceiver system and optical repeaters.

It is another object of the present invention to provide a mobile communication network, which is easily installable and applicable for various purposes while enhancing a cell coverage and drastically reducing an expense for using dedicated lines, by connecting a plurality of compact BTSs along a single optical fiber in regions, such as downtowns, the inside of buildings, around highways, where the reception and transmission of electromagnetic radiation signals are poor.

It is still another object of the present invention to provide a mobile communication network, which can improve efficiency by providing easier frequency allocation of the base transceiver systems using a digital optical transmission technology, including optical transponders and a reference network structure.

To achieve the above objects, there is provided a mobile communication network, comprising: a base station controller for controlling a plurality of compact BTSs; a compact BTS controller linked to the base station controller by the means of E1/T1 links; a plurality of optical fiber links coupled to the compact BTS controller; and, an optical transponder provided in each compact BTS for dividing or synthesizing signals, for transmitting the signals to the RF portion from one compact BTS to another, and for amplifying and transmitting other signals from one compact BTS to another.

BRIEF DESCRIPTION OF THE DRAWINGS

The above and other objects, features, and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described herein below with reference to the accompanying drawings. For the purpose of clarity, well-known functions or constructions are not described in detail as they would obscure the invention in unnecessary detail.

According to the embodiment of the present invention, a plurality of compact BTSs employing a digital optical communication network is provided within a mobile communication network. The function of the compact BTSs is to exchange data with a mobile station within a mobile communication network. The compact BTSs are designed to be compatible with the existing or newly installed base transceiver systems within the mobile network. The structure of the compact BTSs will now be described hereinafter in detail with reference to FIG. 2.

Figure 1:
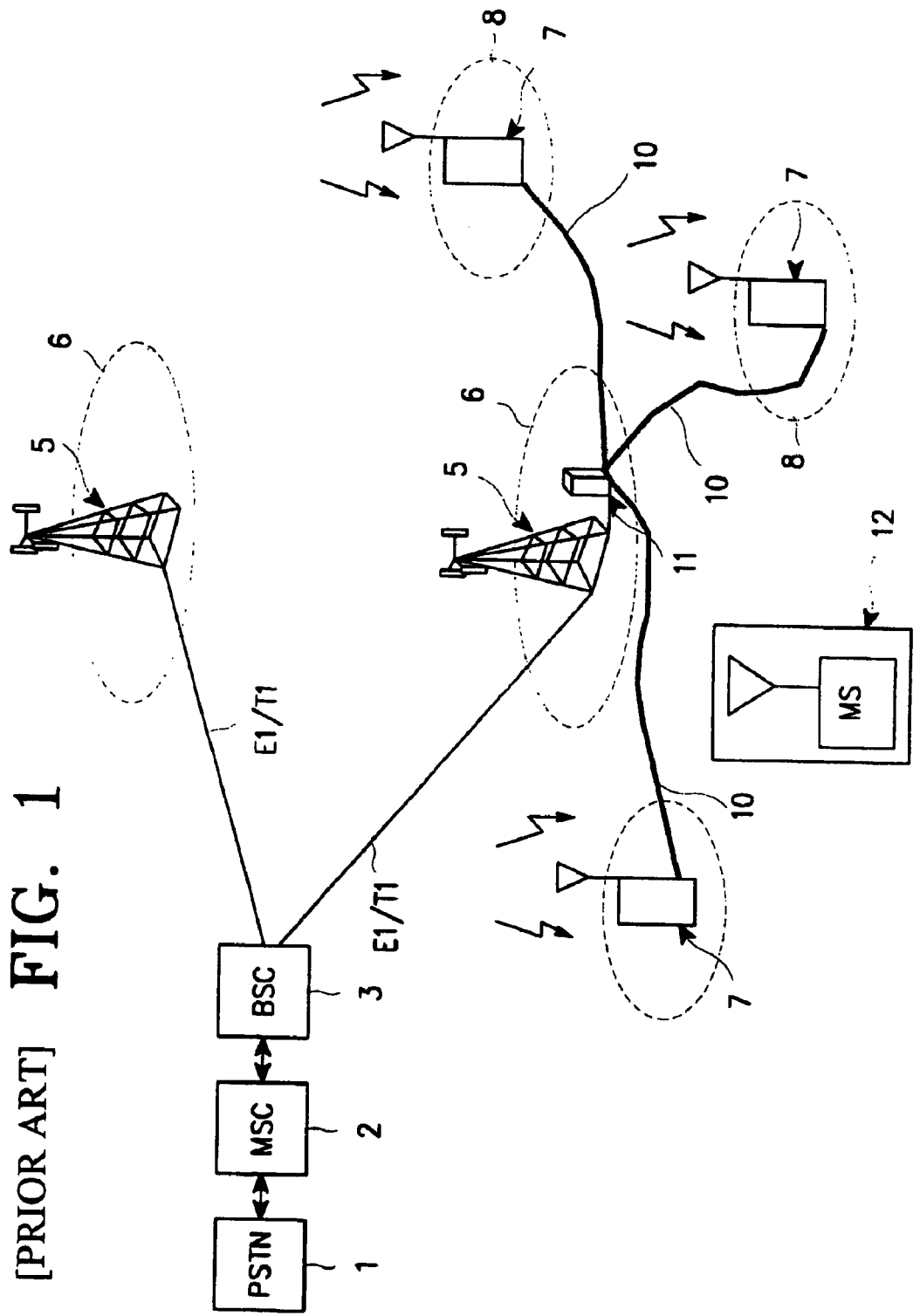
FIG. 1 is a simplified block diagram illustrating a conventional mobile communication network system.
Figure 2:
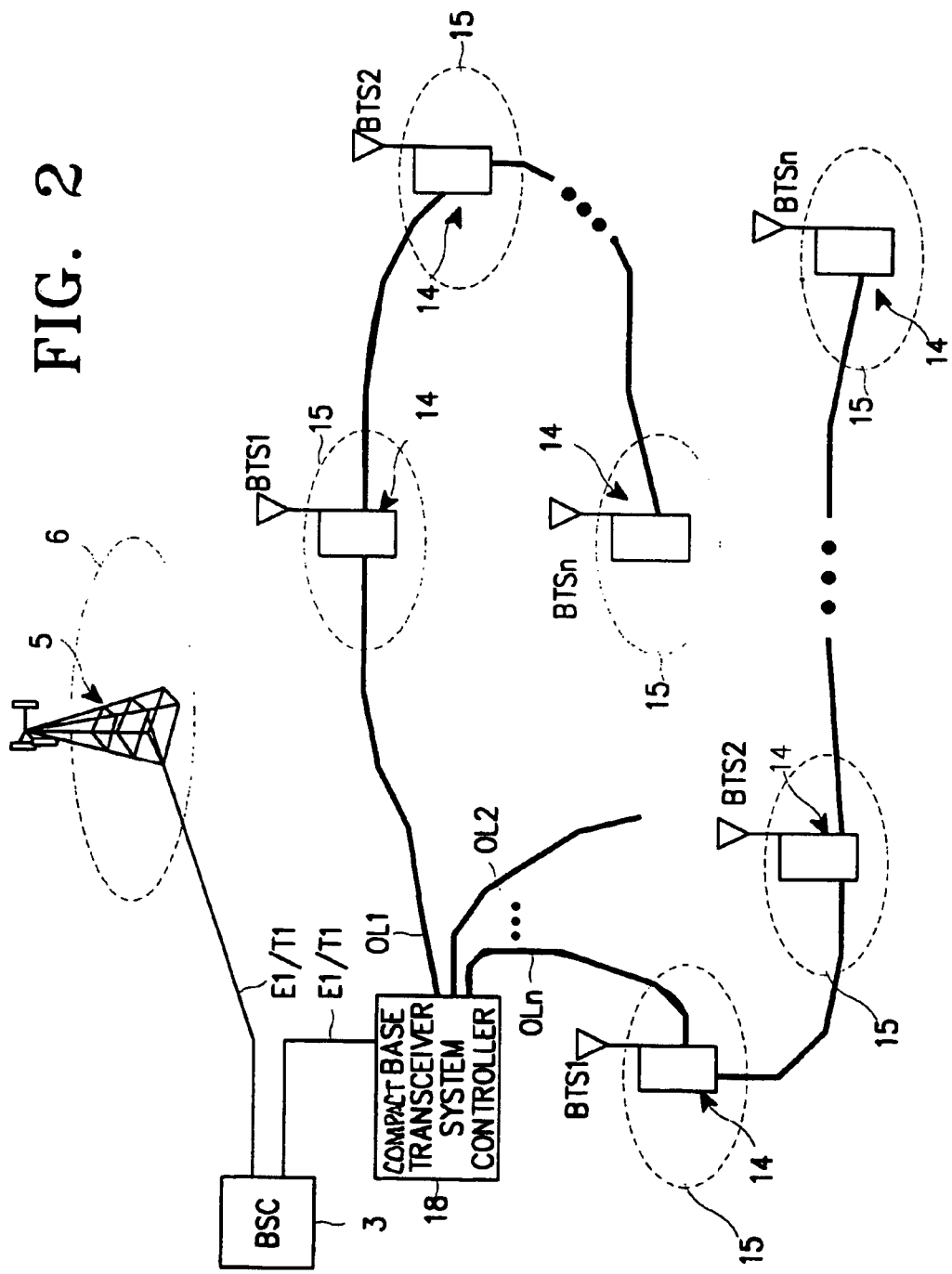
FIG. 2 is a simplified block diagram illustrating a mobile communication network employing digital optical links according to the present invention.
Figure 5:
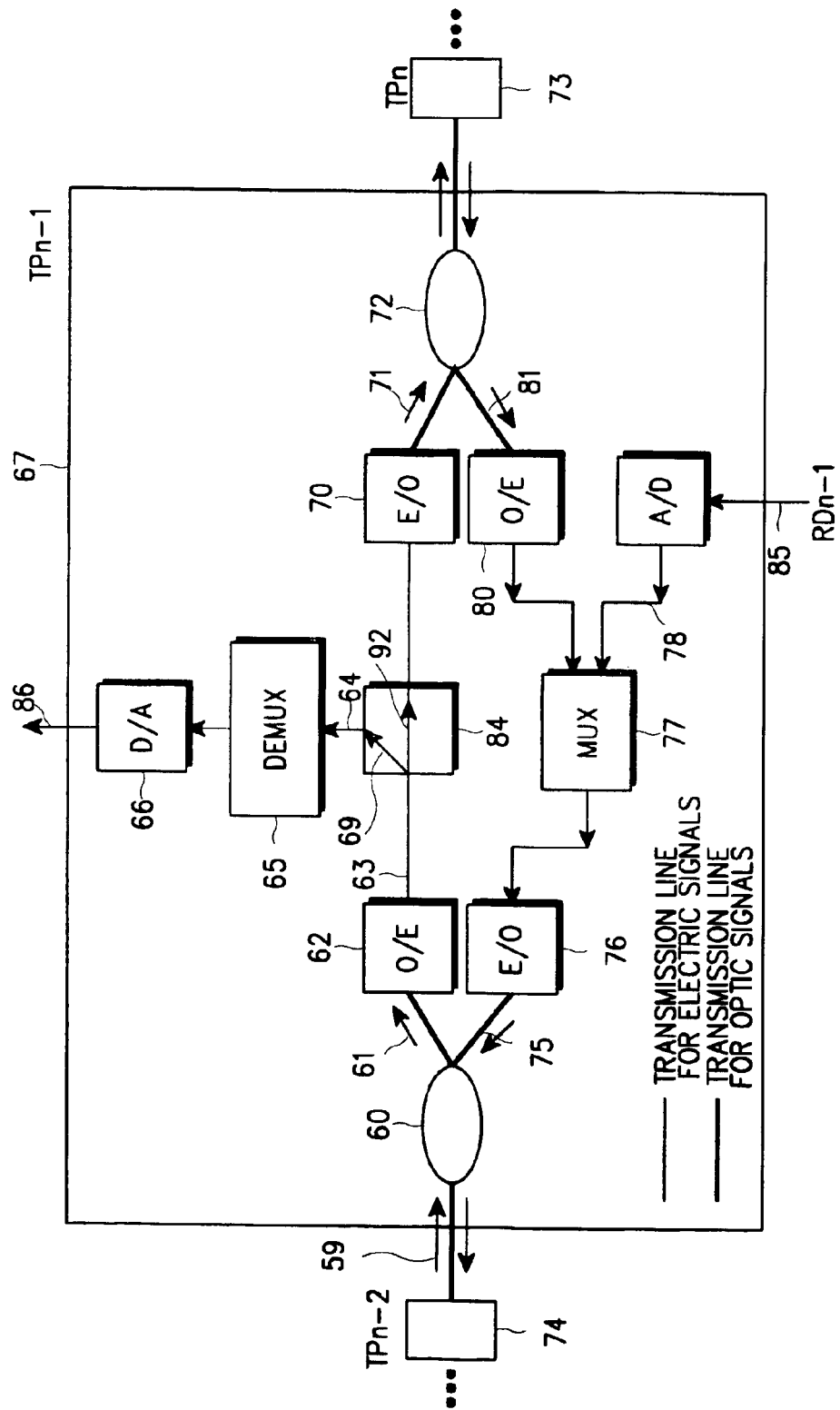
FIG. 5 is a block diagram illustrating the structure of optical transponders provided in the compact BTSs according to the present invention; and, FIG. 6 is a block diagram illustrating the structure of the RF component of the compact BTSs according to the present invention.

FIG. 2 is a simplified diagram illustrating a mobile communication network employing the digital optical links according to the present invention. Among the capacities a compact BTS 18 coupled to the BSC 3, a specific portion is assigned to the compact BTS controller 18 and the remnant capacity is distributed among the plurality of BTSs. In this manner, the compact BTS controller 18 manages the remnant capacity operable by a base station controller 3. The compact BTS controller 18 is coupled to one end of a plurality of digital optical links (OL1, OL2~OLn). Each optical link is coupled through a plurality of base transceiver systems (BTS1, BTS2~BTSn) 14 along the same optical link. A matching device of the BTS controller 18 is provided for matching signals with the compact BTS along a particular fiber link. Each of the compact BTSs 14 linked within the digital optical communication network further includes an optical transponder (as illustrated in FIG. 5) for arranging the plurality of compact BTSs along the same optical link.

The base station controller 3 manages the compact BTS controller 18 with a capacity equivalent or higher than that of the reference BTS such that it is possible to mange the compact BTS controller 18 as well as the compact BTSs. The optical links (OL1, OL2~OLn) capable of linking the respective compact BTSs 14 in line along one optical fiber may be installed to cover multiple locations depending on the capacity of the base station controller 18. The compact BTSs 14 are arranged along the respective optical links (OL1, OL2~OLn) through the optical transponders provided in the respective compact BTSs 14. The cell coverage of the respective compact BTSs 14 may be shaped to form a micro cell and a pico cell. The mobile communication system with the above configurations can be easily adapted in areas near highways, inside tunnels, or in a remote place.

The compact BTSs 14 receive and transmit optical signals that are digitalized by a single optical fiber by means of optical communication networks employing a wavelength division multiplexing, and each compact BTS 14 is connected to one another through optical transponders. The compact BTSs 14 with this communication network type can replace the reference base transceiver system 5 and the optical repeaters used in the prior art system (shown in FIG. 10). Reference numeral 6 represents a service cell coverage area of the reference BTS 5, whereas reference numeral 15 represents a service cell coverage of the respective compact BTSs according to the present invention, allowing more diverse coverage areas in more economical way.

Figure 3:
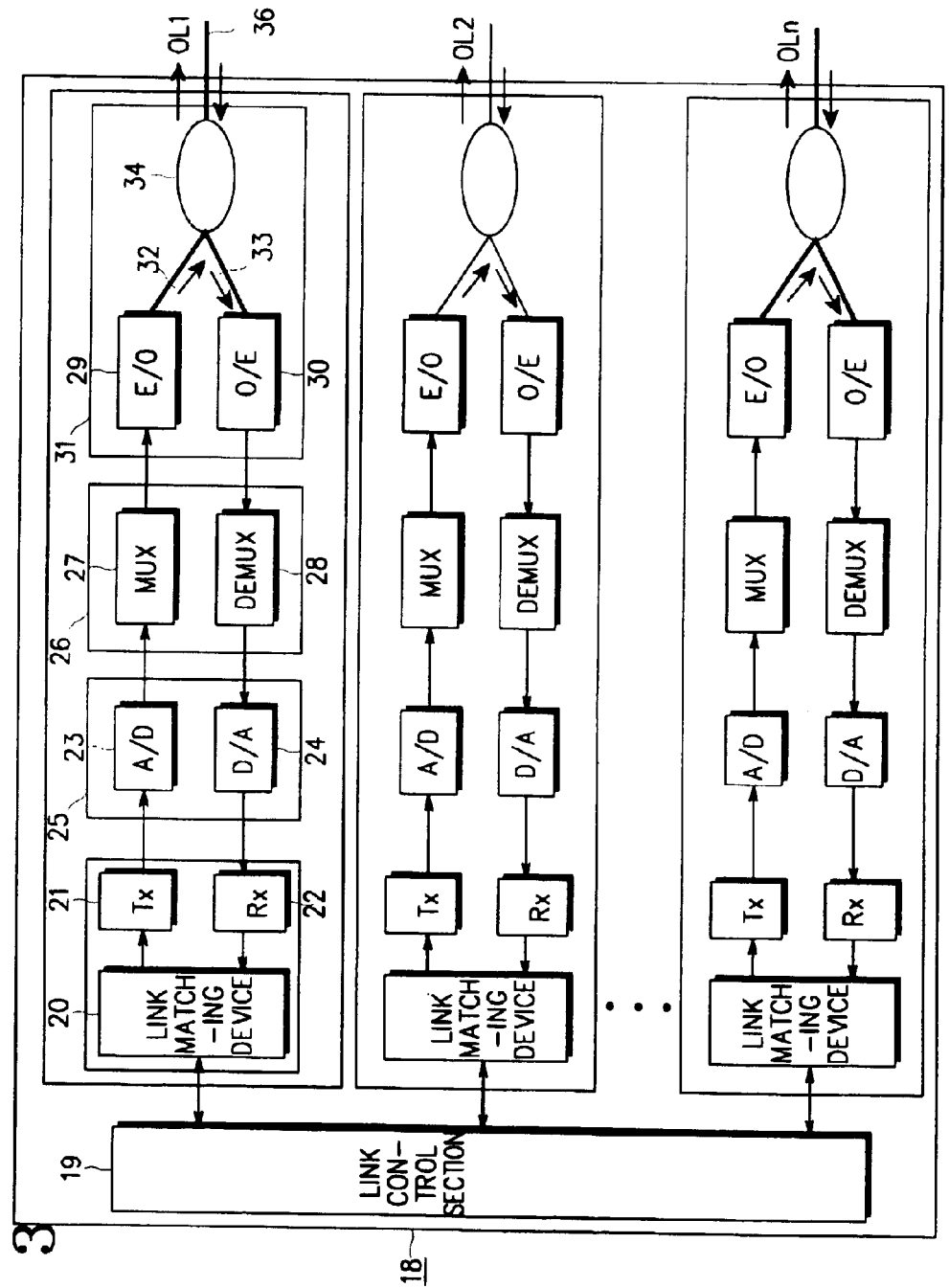
FIG. 3 is a block diagram illustrating the structure of a compact BTS controller according to the present invention.

FIG. 3 is a block diagram illustrating the structure of a compact BTS controller 18 according to the embodiment of the present invention. Referring to FIG. 3, the compact BTS controller 18 includes a link control section 19 for transmitting control signals and data received from the base station controller (BSC) 3 to the respective optical links (OL1, OL2~OLn) of the compact BTS 14; a link matching device 20 with a transmitting section (Tx) 21 and a receiving section (Rx) 22; a conversion section 25 with an AC to DC converter 23 and a DC to AC conveter 24; a multiplex processing section (MUX, DEMUX) 26; and an optical converting section (E/O, O/E) 31. The optical converting section 31 includes an optical coupler (WDM) 34 for transmitting the optical signals of a particular wave inputted from an electro-optical converter 29 to the optical link, and for transmitting the optical signals of a particular wave inputted from the optical link to the appropriate photoelectric converter 30.

The link control section 19 classifies data transmitted from the base station controller 3 according to the assigned link, frequency assignment (FA), and sector information to the respective optical links (OL1, OL2~OLn) 36. The link matching device 20 serves to distinguish between the forward signals 32 that are transmitted from the compact BTSs 14 to a particular terminal unit and the reverse signals 33 that are transmitted from the terminal unit to the compact BTSs 14. The link matching device 20 also transmits forward analogue IF signals to the digitalizing section 25, and transmits the reverse IF signals received from the digitalizing section 25 to the link control section 19. The function of the digitalizing section 25 is to convert forward analogue signals into digital signals using an analogue/digital converting section 23, and to convert reverse digital signals into analogue signals using a digital/analogue converting section (D/A) 24 so as to transmit the converted analog signals to the compact base transceiver devices 18.

The forward digital signals are multiplexed into a plurality of channels in conformity with the numbers of the compact BTSs by the multiplexer (MUX) 27. The multiplexed digital signals are converted into optical signals at a particular wavelength by the electro-optical converter (E/O) 29. Similarly, the digitalized optical signals received from the compact base transceiver devices 14 are demuliplexed to the photoelectric converter 30 using a demultiplexer (DEMUX) 28. Then, the analogue signals are demodulated into digital signals and transferred to the base station controller 3.

Figure 4:
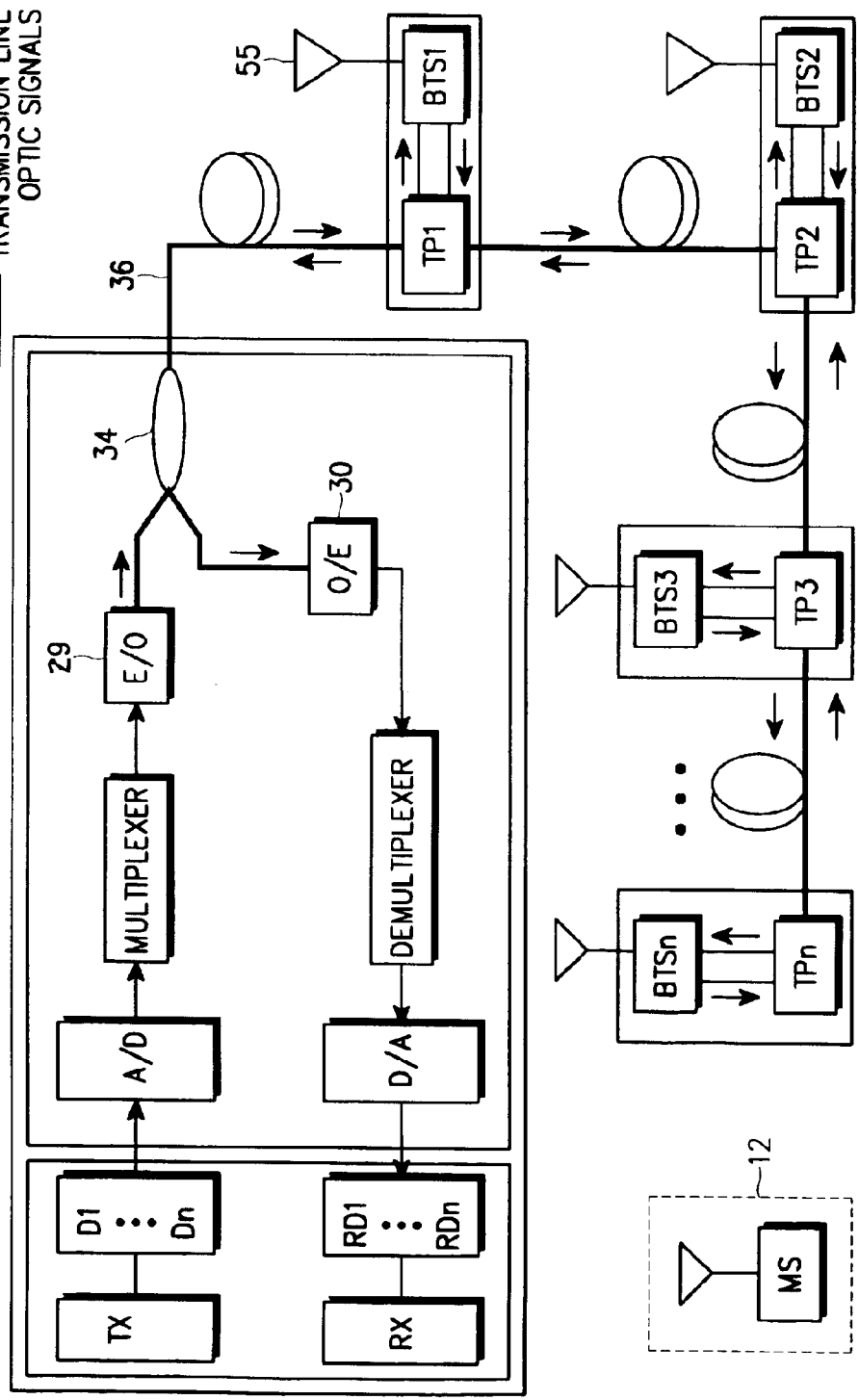
FIG. 4 is a block diagram illustrating the structure of compact BTSs according to the present invention.

FIG. 4 is a simplified block diagram illustrating the structure of a compact BTS coupled to one optical link according to the embodiment of the present invention.

Referring to the signal paths in FIG. 4, a thin line represents a transmission line for electric signals, and a thick line represents a transmission line for optical signals.

Referring to FIG. 4, the optical signals are classified and digitalized according to the FAs and the sector information of the respective compact BTSs that are being transmitted to the respective compact BTS (BTS1, BTS2~BTSn) along the optical fiber 36. The plurality of signals transmitted through the optical fiber 36 are transferred to the respective compact BTS through the optical transponders (TP1, TP2~TPn) provided in each compact BTS 14. Although the plurality of compact BTSs (BTS1, BTS2~BTSn) linked along the optical link are achieved by a long single optical fiber 36, digital signals are amplified and restored each time the signals are passed through the respective optical transponders (TP1, TP2~TPn) along the same optical fiber. Thus, the digital signals along the optical fiber 35 are maintained. Hence, the compact BTS can be installed in the regions where the transmission and reception of electromagnetic radiation signals are low, i.e., in tunnels and hidden streets, so that communication with a mobile station in such regions can be realized.

The forward signals transmitted to the respective BTS (BTS1, BTS2~BTSn) along the same fiber link are multiplexed and converted into optical signals that are distinguishable by the respective optical transponders (TP1, TP2~TPn). The reverse signals transmitted from the compact BTSs (BTS1, BTS2~BTSn) are converted into electric signals and demultiplexed so as to be distinguished from one another. The function of optical transponders (TP1, TP2~TPn) provided in the respective compact BTS is to divide/synthesize incoming signals matching to the same RF part of the receiving compact BTS, and amplify and transmit other signals that do not match the RF part of the receiving compact BTS to the next compact BTS. That is, each optical transponder filters signals that fall within the range of allocated frequency assigned to a given compact BTS and transmits other signals to the next compact BTS.

FIG. 5 is a diagram illustrating the inside components of the optical transponders according to the present invention. A function of an optical transponder in the n−1$^{th}$ compact BTS will be described herein below with reference to FIG. 5. Forward optical signals 59 are divided depending on their wavelength by an optical coupler 60. The divided optical signals 61 are photoelectrically converted by a photoelectric converter (O/E) 62, and the photoelectrically converted electric signals 63 are further divided into two signals by a high frequency divider 84, with one electric signals 92 being transmitted to an electro-optical converter 70, and the other electric signals 69 being transmitted to an n−1$^{th}$ demultiplexer 65. The electric signals 64 divided by the high frequency divider 84 are demultiplexed by the demultiplexer 65, and then converted into analogue signals by a digital/analogue converter 66. Then, digitalized signals 86 are transmitted to the RF parts of the compact BTSs. Thereafter, the converted analog signals are converted into a radio frequency after being synthesized with an intermediate frequency and transmitted in the air, via an antenna, to a terminal unit by a power amplifier. The RF parts 89 of the compact base transceiver devices are described later with reference to FIG. 6. The other signals 92 divided by the high frequency divider 84 are modulated into optical signals 71 by the electro-optical converter 70, and transmitted to an optical transponder (TPn) 73 of the n$^{th}$ compact base transceiver system through an optical coupler 72.

At the same time, the reverse signals received from the optical transponders 73 in adjacent compact BTSs are divided according to the wavelength by the optical coupler 72, and the divided optical signals 81 are photoelectrically converted by a photoelectric converter 80. Thereafter, the photoelectrically converted electric signals are multiplexed with reverse signals 78 of the n−1$^{th}$ compact base transceiver system by a multiplexer 77, and transmitted to the n−2$^{th}$ optical transponder (TPn−2) through an electro-optical converter 76.

Figure 6:
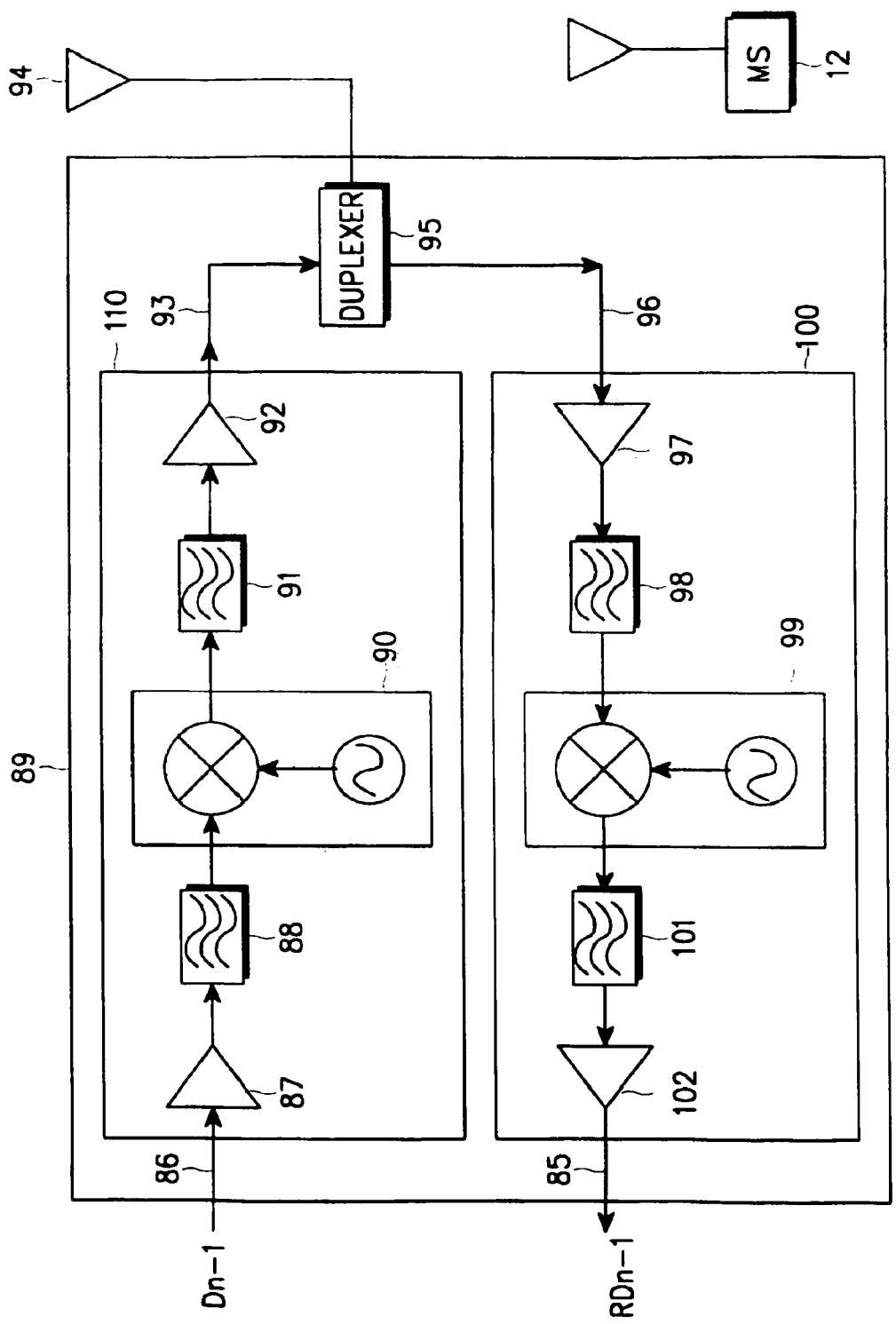

FIG. 6 is a block diagram illustrating the RF parts 89 of compact BTSs. The RF parts 89 of the compact BTSs comprise a forward signal processing section 11 for processing forward signals transmitted to a mobile station 12 through wireless networks, a reverse signal processing section 100 for processing reverse signals transmitted from the mobile station 12 through the wireless networks, and a duplexer 95 for transmitting signals received from the forward signal processing section 110 to the mobile station 12 through the wireless networks by the means of an antenna or transmitting signals received from the mobile station 12 to the reverse signal processing section 100. To be specific, the forward signals inputted in the n−1$^{th}$ compact base transceiver system are amplified by an analogue amplifier 87. Thereafter, the amplified signals are filtered by a filter 88 based on necessary bands and modulated into radio signals through a frequency-up converter 90. The modulated signals are re-filtered by another filter 91 and the re-filtered signals 93 are amplified by a power amplifier 92, then transmitted to a duplexer 95. The duplexer 95 performs a radio transmission/reception to and from the mobile station 12 by the means of the antenna 94. Similarly, the reverse signals 96 transmitted from the mobile station 12 are amplified through the duplexer 95 by a low-noise amplifier 97. A frequency required by a filter 98 is transmitted to a frequency-down converter 99, a frequency required by a filter 101 is transmitted to an amplifier 102, then the transmitted signals are amplified by the amplifier 102 so as to be transmitted to an analogue/digital converter of the optical transponders.

As a result, the part RF 89 of the compact base transceiver system filters necessary bands among signals received from the mobile station 12 through the antenna 94, and transmits the signals to the optical transponders. The signals are synthesized again with the reverse signals of the n−1$^{th}$ compact BTS and converted into optical signals by an optical transmitter so as to be transmitted to the optical transponders in an adjacent compact BTS toward the BTS controller direction. The optically modulated signals of the respective compact BTSs are added by the optical coupler of the respective compact base transceiver devices so as to be transmitted to a compact BTS controller.

As described above, the base transceiver system for mobile communication using digital optical links and optical transponders according to the present invention has the advantage of providing high speed/massive capacity and multimedia services, thereby facilitating use and the addition of a frequency allocation of each base transceiver system. Further, the mobile communication base transceiver system according to the present invention has another advantage of realizing an economic installation of networks without any additional installation of a reference base transceiver system and optical repeaters requiring a considerable amount of installation cost, while achieving efficient access between the base transceiver systems.

While the invention has been shown and described with reference to certain preferred embodiments thereof, it will be understood by those skilled in the art that various changes in form and detail may be made therein without departing from the spirit and scope of the invention as defined by the appended claims.

What is claimed is:

1. A mobile communication system employing a plurality of digital optical links, said system comprising:
   a base station (BS) controller for managing overall control within said mobile communication system, said BS controller coupled to a base transceiver system (BTS) via a first E1 or T1 link;
   a compact base transceiver system (BTS) controller coupled to said BS controller via a second E1 or T1 link for managing channel capacity of a plurality of compact base transceiver systems (BTSs); and
   a plurality of optical fiber links coupled to said BTS controller at one end via an optical coupling and the plurality of said compact BTSs at the other end; wherein said plurality of compact base transceiver systems (BTSs) have a plurality of optical transponders arranged in spaced relation with each other along each of said optical fiber links, said optical transponders being operative for receiving, along the respective optical fiber link, an optical signal traveling away from said BTS controller in a forward direction, the forward optical signal to be retransmitted as a down-link signal if at one frequency, and for amplifying, if at another frequency, the received optical signal and transmitting the amplified signal to another compact BTS along said optical fiber link in said forward direction.

2. The system of claim 1, wherein said down-link signal corresponds to the radio frequency (RF) of said compact BTS, and wherein said amplified signal is forwarded to an RF portion of said another compact BTS disposed along said optical fiber link in said forward direction.

3. The system of claim 1, wherein said compact BTS controller comprises:
   a link control section for dividing incoming signals received from said BS controller according to a link, a frequency assignment and a sector information extracted from said incoming signal, and for transferring the divided signals to the plurality of said optical fiber links;
   a link device for matching signals exchanged between one of the plural compact BTSs and a mobile station in communication with the one compact BTS;
   a conversion section coupled to said link device for converting an IF (intermediate frequency) signal propagating in said forward direction into a digital signal and for converting an IF signal propagating in said reverse direction into an analog signal; and
   a multiplexing section coupled to said conversion sector for multiplexing the forward digital signals into a plurality of channels and for demultiplexing signals from one of said optical fiber links to be transferred to said link control section.

4. The system of claim 3, further comprising an optical converting section coupled between said multiplexing section and one of said optical fiber links for converting from an electrical signal to an optical signal and vice versa.

5. The system of claim 4, wherein said optical converting section further comprises a coupler for transmitting the converted optical signals at a particular frequency to one of said optical fiber links, and for transmitting optical signals received from one of said optical fiber links to said optical converting section.

6. The system of claim 1, wherein the number of said optical fiber links is limited by the capacity of said BS controller.

7. The system of claim 1, wherein each one of said plurality of optical transponder comprises:
   a first optic coupler for dividing forward optical signals inputted from a previous optical transponder according to wavelength received therein;
   a first photoelectric converter for photoelectrically converting said forward optical signals divided by said first optical coupler;
   a high frequency divider for dividing electric signals photoelectrically converted by said first photoelectric converter into a first signal and a second signal;
   a demultiplexer for demultiplexing said first signal and for outputting said demultiplexed first signal to an RF portion of a current compact BTS;
   a first electro-optical converter for electro-optically converting said second signal; and
   a second optical coupler for dividing said converted second signal according to the wavelength received therein and forwarding the converted second signal to a next optical transponder.

8. The system of claim 7, further comprising:
   a second photoelectric converter for photoelectrically converting signals received from said second optical coupler;
   a multiplexer for multiplexing electric signals received from said second photoelectric converter; and
   a second electro-optical converter for electro-optically converting the multiplexed electric signals and for forwarding the converted, multiplexed signals to said previous optical transponder via said first optical coupler.

9. A method for providing a mobile communication system employing a plurality of digital optical links, said method comprising the acts of:
   providing a base station (BS) controller for managing overall control within said mobile communication system, said BS controller coupled to a base transceiver system (BTS) via a first E1 or T1 link;
   providing a compact base transceiver system (BTS) controller coupled to said BS controller via a second E1 or T1 link for managing the channel capacity of a plurality of compact base transceiver systems (BTSs); and
   providing a plurality of optical fiber links coupled to said BTS controller at one end via an optical coupling and the plurality of said compact BTSs at the other end; wherein said plurality of compact base transceiver systems (BTSs) have a plurality of optical transponders arranged in spaced relation with each other along each of said optical fiber links, said optical transponders being operative for receiving, along the respective optical fiber link, an optical signal traveling away from said BTS controller in a forward direction, the forward optical signal to be retransmitted as a down-link signal if at one frequency, and for amplifying, if at another frequency, the received optical signal and transmitting the amplified signal to another compact BTS along said optical fiber link in said forward direction.

* * * * *